United States Patent

[15] 3,644,691

Suzuki

[45] Feb. 22, 1972

[54] LIQUID LEVEL INDICATOR INSTRUMENT

[72] Inventor: Shigeru Suzuki, Yokohama, Japan
[73] Assignee: Ricoh Co., Ltd., Tokyo, Japan
[22] Filed: Apr. 24, 1970
[21] Appl. No.: 31,628

[30] Foreign Application Priority Data

Apr. 25, 1969 Japan..................................44/32509

[52] U.S. Cl. ...............................200/84 R, 200/78, 73/308
[51] Int. Cl. ........................................................H01h 35/18
[58] Field of Search ..................200/44, 74, 78; 73/308, 322; 340/244 A

[56] References Cited

UNITED STATES PATENTS 1,158,586  11/1915  Thornton, Jr. ........................200/84 R
1,802,383  4/1931  Jarvis ...................................200/84 R

FOREIGN PATENTS OR APPLICATIONS 255,552  10/1927  Italy ......................................200/84 R

*Primary Examiner*—David Smith, Jr.
*Attorney*—Henry T. Burke, Robert Scobey, Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

The invention provides an improved float-type liquid level instrument wherein when a liquid level is higher than or at a predetermined level, a rod extending from a float moves into the path of a continuously driven switch-actuating means so that the latter is retained in inoperative position, but when the liquid level falls below the predetermined level, the rod moves away from the path so that the switch-actuating means continuously moves between a switch-actuating position and the inoperative position, whereby the switch is intermittently closed and opened, thereby generating electrical signals. As a result, a more rigid and larger switch having a longer life may be advantageously employed and the operation becomes more reliable and precise than with prior instruments since a stronger force may be applied through switch-actuating means to the switch.

10 Claims, 4 Drawing Figures

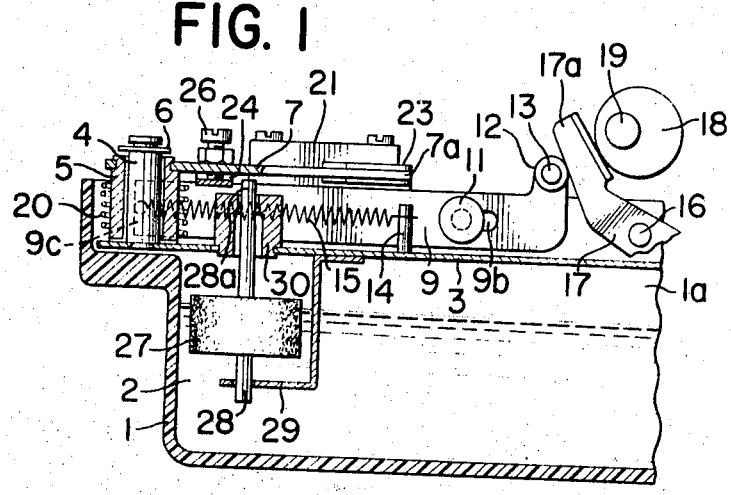
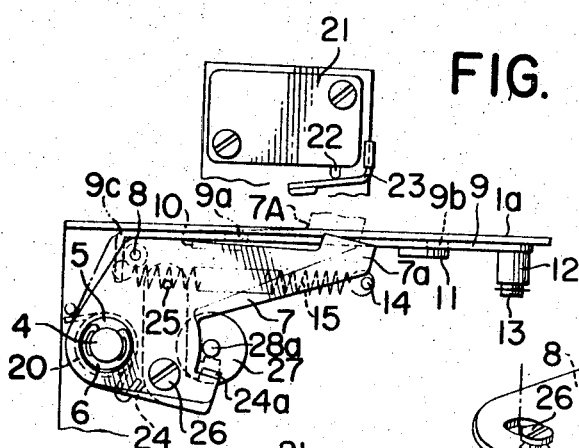
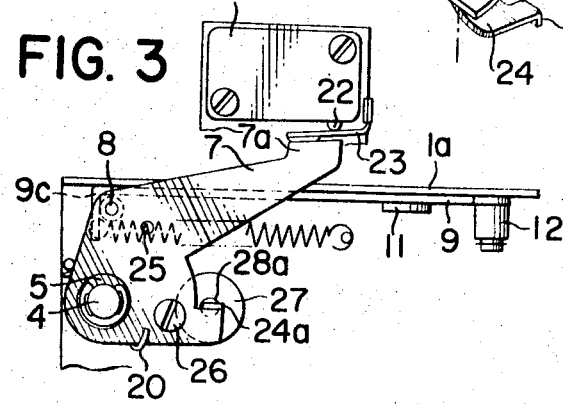
INVENTOR
SHIGERU SUZUKI ized or miniaturized switch which can be closed or opened by the small buoyant force on the float may be used. Such a small sized or miniaturized switch has inevitably a shorter durability and is readily susceptible to damage so that it may have to be replaced very often. Furthermore, since the actuation of such a switch is dependent upon a small force transmitted from the float, the switch may not be actuated sometimes even though the float does move up and down by a predetermined distance. Therefore, the precise liquid level measurement becomes impossible. When a large sized float is employed in order to increase the force acting upon the switch, so as to obtain more reliable and precise operation, the liquid level instrument becomes large in size, so that it cannot be installed in practice.

LIQUID LEVEL INDICATOR INSTRUMENT

BACKGROUND OF THE INVENTION

The present invention relates to a liquid level instrument and more particularly a float-type liquid level instrument having a switch which is actuable in response to a variation in liquid level for generating an electrical signal representative of the liquid level.

The measurement of liquid levels is of great importance in the industrial field, particularly when control may be also a factor. The level of the materials may affect the quality of the products. The electrical signals representative of the liquid levels are required in an automated process for centralization of the control, for use of feedback control and program control, mechanization of trouble detection, prevention and correction by safety control and of information collection, transmission and interpretation through computers or other data-processing devices and so on. The simplest system for this purpose may consist of a float and a switch so that when the liquid level rises above or falls below a predetermined level, the switch is actuated by the float through a suitable linkage or the like. However, the force transmitted from the float for actuating the switch is generally weak so that only a small sized or miniaturized switch which can be closed or opened by the small buoyant force on the float may be used. Such a small sized or miniaturized switch has inevitably a shorter durability and is readily susceptible to damage so that it may have to be replaced very often. Furthermore, since the actuation of such a switch is dependent upon a small force transmitted from the float, the switch may not be actuated sometimes even though the float does move up and down by a predetermined distance. Therefore, the precise liquid level measurement becomes impossible. When a large sized float is employed in order to increase the force acting upon the switch, so as to obtain more reliable and precise operation, the liquid level instrument becomes large in size, so that it cannot be installed in practice.

SUMMARY OF THE INVENTION

The present invention has been made so as to eliminate these defects as described above.

It is therefore the general object of the present invention to provide an improved float-type liquid level instrument having a switch generating an electrical signal representative of a liquid level.

It is another object of the present invention to provide an improved float-type liquid level instrument of the character described above capable of employing a switch more rigid, larger in size and longer in life than the conventional small sized or miniaturized switch.

It is a further object of the present invention to provide an improved float-type liquid level instrument of the character described above which is more reliable and precise in operation and very quick to respond to the liquid level variation yet simple in construction with a minimum number of structural parts and inexpensive to manufacture.

In brief, the present invention provides a liquid level instrument comprising in combination a normally open or closed switch, means for actuating said switch, said switch-actuating means being movable at least between a first position at which said switch-actuating means closes or opens said switch and a second position at which said switch-actuating means opens or closes said switch, means for driving said switch-actuating means between said at least first and second positions, float means having a vertically coaxially extending rod formed integrally therewith and adapted to move up and down in response to a variation in liquid level, guide means for said rod, and said rod moving into the path of said movement of said switch-actuating means when said float means moves upwardly of a predetermined liquid level so that said rod engages with said switch actuating means, thereby stopping said movement thereof and retaining it in said second position while said rod moves away from said path when said float means moves downwardly of said predetermined liquid level so that said switch actuating means is permitted to move between said first and second positions, whereby said switch is intermittently closed and opened so as to generate electrical signals.

According to one aspect of the present invention, detent means is fixed to the switch-actuating means so as to engage with the rod. This detent means is adjustable in height so that the position at which the rod engages with the detent means is adjustable, that is the liquid level at which the switch is actuated may be adjusted.

The above and other objects, features and advantages of the present invention becomes more apparent from the following description of the preferred embodiment thereof taken in conjunction with the accompanying drawing.

BRIEF DESCRIPTION OF THE DRAWING:

FIG. 1 is a sectional view of the embodiment of a liquid level instrument in accordance with the present invention;

FIGS. 2 and 3 are fragmentary plan views for explanation of the mode of operation thereof; and FIG. 4 is a perspective view of a switch-actuating lever thereof.

DESCRIPTION OF THE PREFERRED EMBODIMENT

Referring to FIG. 1 a liquid chamber 1 containing a liquid 2 is closed with a cover 3 having a pin 4 securely fixed thereupon. A hollow shaft 5 is rotatably fitted over the pin 4 and prevented from being pulled outwardly by an E-ring 6 fitted at the upper end of the pin 4. A switch-actuating member 7 (See FIG. 4) is carried by the hollow shaft 5 and a pin 8 is extending from the undersurface of one arm of the switch-actuating member 7. A horizontal lever 9 has elongated slots 9a and 9b into which are loosely fitted rivets 10 and 11 each having a head and extending from a sidewall of the liquid chamber 1, so that the lever 9 may slide horizontally in FIG. 1. One end (the left end in FIG. 1) of the lever 9 is bent inwardly at a right angle thereby constituting an engaging member 9c for engagement with the pin 8. A roller 12 is rotatably fixed to the other end of the lever 9 by a pin 13. A tension spring 15 is loaded between a pin 14 extending from the cover 3 and the one end of the lever 9 so that it is normally biased so as to move to the right in FIG. 1.

The lever 9 is continuously driven in oscillating movement and in turn, drives the switch-actuating member 7 in the following manner. At the right of the lever 9 in FIG. 1, a rocking member 17 is pivotably fixed by a pin 16 to the sidewall 1a and the roller 12 is pressed against the rear edge of one arm 17a of the rocking member 17 because of the tendency of the lever 9 to move to the right described above, so that the arm 17a of the rocking member 17 is pressed against an eccentric cam 18 which is normally driven by a suitable means (not shown). Therefore the rocking member 17 is caused to rock by the eccentric cam 18, thereby pushing the roller 12 toward the left. Subsequently, the lever 9 is caused to reciprocate horizontally in FIG. 1 unless the lever 9 is locked as will be described hereinafter. The switch-actuating member 7 is biased by a spring 20 fitted over the hollow shaft 5 so as to normally rotate in the counterclockwise direction in FIG. 2. In FIG. 2 where the lever 9 is shown as being at its right position, the engaging member 9c engages with the pin 8, so that the rotation of the switch-actuating member 7 is limited. One arm of the switch-actuating member 7 constitutes a switch-pushing member 7a for pushing a switch pin-actuating member 23 which in turn pushes a movable pin 22 extending from a switch 21 (See FIG. 2) when the switch-actuating member 7 rotates in the counterclockwise direction. Therefore it is seen that when the lever 9 returns to the right in FIG. 1 the engaging member 9c of the lever 9 engages with the pin 8, so that the switch-actuating member 7 is caused to rotate against the spring 20 in the clockwise direction, thereby releasing the switch-pushing end 7a of the switch-actuating member 7 from the switch pin actuating element 23 thereby opening the switch 21. When the lever 9 moves to the left in FIG. 1, the rotation in the counterclockwise direction of the switch-actuating lever 7 is permitted by the spring 20 since the engaging member 9c is not locking the pin 8 so that the switch-pushing end 7a pushes the switch pin-actuating member 23 thereby closing the switch 21. Thus, the switch 21 is opened and closed intermittently in response to the reciprocation of the lever 9 which continuously drives in oscillating pivotal movement the switch-actuating lever 7 about the pin 4 unless the lever 7 is locked as will be described hereinafter.

An engaging member 24 is disposed at the undersurface of the switch-actuating lever 7 in such a manner that its one end (engaging end) is positioned at the end of the other arm of the switch-actuating lever 7 while the other end of the engaging member 24 is securely fixed to a pin 25. The lower end of a screw 26 threaded through the switch-actuating lever 7 is in contact with the upper side of the engaging member 24 so that the engaging end 24a may be vertically adjusted by tightening or loosening the screw 26.

A float 27 in the liquid 2 has a vertically coaxially extending rod 28 whose upper end is vertically slidably journaled by an upper bearing member 30 securely fixed to the cover 3 while the lower end is also vertically slidably journaled to an L-shaped bracket 29 fixed to the undersurface of the cover 3. Thus the float 27 vertically moves as the liquid level of the liquid 2 rises and falls. The upper end 28a of the control rod 28 is extending into the path of the engaging end 24a of the engaging member 24 which rotates in unison with the switch actuating lever 7. Therefore, upon the vertical movement of the float 27, the upper end 28a of the control rod 28 moves into and away from the path of the engaging end 24a of the engaging member 24 and provides an indication of the level of the liquid within the container with respect to a predetermined level. When the liquid level is at a predetermined level or higher than this level, the upper end 28a remains in the path so that the rotation of the engaging member 24 and consequently the switch-actuating lever 7 is prevented. That is, the switch-actuating lever 7 is only permitted to rotate between the positions indicated by the solid and chain lines 7A in FIG. 2, so that the pushing end 7a cannot push the switch pin-actuating member 23 of the switch 21. The switch 21 remains opened.

When the liquid level falls below the predetermined level, the float 27 moves downwardly so that the upper end 28a of the control rod 28 is moved away downwardly from the path of the engaging end 24a of the engaging member 24. Therefore, the rotation of the member 24 and consequently of the switch actuating lever 7 is permitted so that the pushing end 7a of the lever 7 intermittently pushes the switch pin-actuating member 23 in a manner described hereinabove. That is, the switch 21 is intermittently opened and closed. The switch 21 may be connected to an alarming device such as pilot lamps, buzzers or a liquid feed circuit, thereby actuating them in response to the liquid level in the chamber 1. Since the switch 21 is intermittently opened and closed as described hereinabove, the pulse signals are obtained. In the instant embodiment, the switch 21 has been described as being an normally open switch, but it will be understood that a normally closed switch may be also employed.

The position of the engaging end 24a of the engaging member 24 is suitably adjusted by tightening or loosening the screw 26 for controlling the timing when the engaging end 24a engages with the upper end 28a of the control rod 28 of the float 27. If required, this engaging member 24 may be eliminated. In this case, the switch-actuating lever 7 may be so designed that its the other arm may engage with the upper end 28a of the control rod 28. The switch-actuating lever 7 has been described as being the one which makes a pivotal motion, but it will be understood that a reciprocating or rotary member may be also used. The mechanism for causing the switch actuating lever 7 to rotate is not limited to the one illustrated and described hereinabove.

I claim:
1. A liquid level indicator instrument comprising:
   a. switch means;
   b. means for actuating said switch means being movable between a switch-opening and a switch-closing position;
   c. means for continuously driving said actuating means in oscillating movement between said switch-opening and said switch-closing position;
   d. float means immersed in said liquid for vertical movement in accordance with variations in the liquid level; and
   e. means constrained to move with said float for interrupting the oscillating movement of said actuating means when the liquid is above a predetermined level, while permitting said oscillating movement when the liquid is below said predetermined level such that the switch means is alternately opened and closed, thereby providing an indication of the level of the liquid with respect to said predetermined level.

2. An instrument as in claim 1, including spring means for biasing said actuating means toward the switch-closing position and means on said constrained means for holding said actuating means against the action of said spring means.

3. An instrument as in claim 2, wherein said driving means includes means for intermittently overcoming the bias of said spring means.

4. An instrument as in claim 3, wherein said driving means includes a reciprocating member having means thereon for engaging said actuating means to produce coincident movement therebetween during a portion of the reciprocation.

5. An instrument as in claim 1, wherein said actuating means comprises a pivoted lever oscillating in a substantially horizontal plane and stop means on said lever for engagement by said constrained means.

6. An instrument as in claim 5, wherein said constrained means comprises a substantially vertical member on said float and including guide means for limiting said member to vertical movement.

7. An instrument as in claim 5, including means for varying the height of said stop means to select the predetermined level.

8. In a device for indicating the level of a liquid in a container relative to a predetermined level and of the type comprising:
   a. float means buoyantly supported in said liquid for movement in accordance with variations in the liquid level;
   b. signal means for indicating when said float means is above or below a predetermined level;
   c. means for tracking the position of said float means; and
   d. means for actuating said signal means in response to the position of said tracking means;
   the improvement wherein:
   e. said tracking means comprises means constrained to move with said float; and
   f. said actuating means comprises continuously oscillating means for intermittently actuating said signal means and positioned such that the actuation of said signal means is interrupted by the engagement of said oscillating means by said constrained means when the liquid is above a predetermined level.

9. A device as in claim 8, including a cover for said container on which said actuating means is mounted.

10. A device as in claim 9, wherein said actuating means comprises a pivotally mounted oscillating lever and said constrained means comprises a rod on said float for interrupting the oscillation of said lever.

* * * * *